W. H. COLLIER.
COMBINED DASH LIGHT, TROUBLE LIGHT, AND CIGAR LIGHTER.
APPLICATION FILED JUNE 9, 1913.
1,144,172.  Patented June 22, 1915.
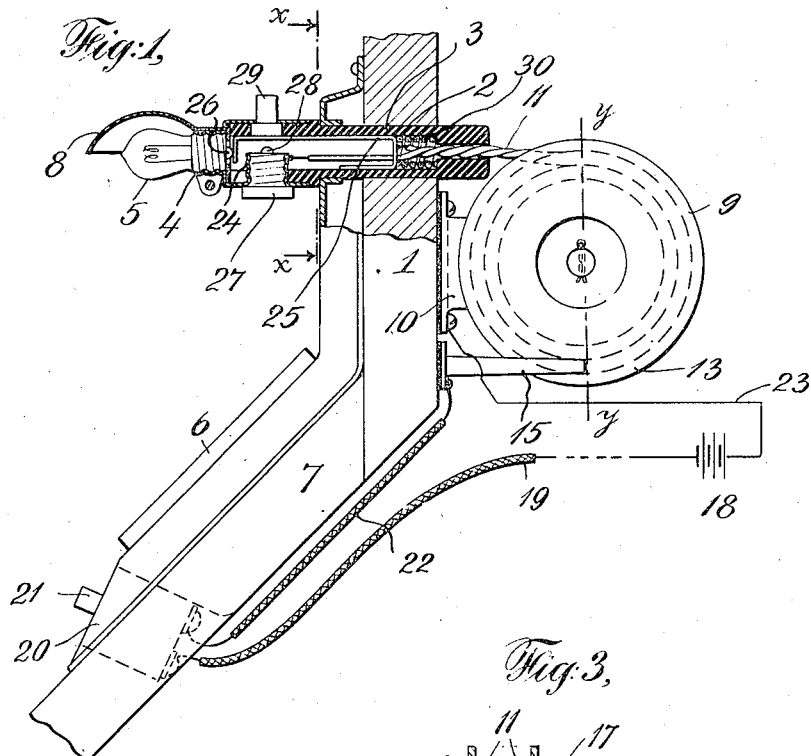
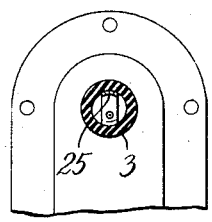
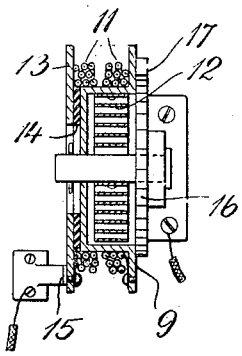
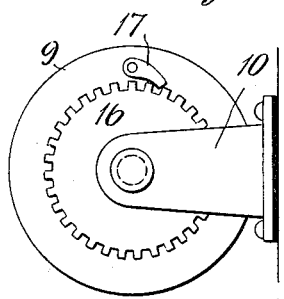
Witnesses:
Max B. A. Döring
Paul H. Franke
Inventor
William H. Collier
By his Attorneys

UNITED STATES PATENT OFFICE.

WILLIAM H. COLLIER, OF NASHVILLE, TENNESSEE.

COMBINED DASH-LIGHT, TROUBLE-LIGHT, AND CIGAR-LIGHTER.

1,144,172.     Specification of Letters Patent.      Patented June 22, 1915.

Application filed June 9, 1913. Serial No. 772,651.

*To all whom it may concern:*

Be it known that I, WILLIAM H. COLLIER, a citizen of the United States of America, and a resident of Nashville, in the county of Davidson and State of Tennessee, have invented a certain new and useful Combined Dash-Light, Trouble-Light, and Cigar-Lighter, of which the following is a specification.

My invention relates to auxiliary lighting devices for vehicles (by which latter term I intend to include not only road vehicles, but also railway vehicles, boats, and aeroplanes and other air vehicles;) and my invention is also susceptible of use in other connections than with vehicles; its principal field of use, however, being in connection with vehicles.

Many kinds of vehicles, and particularly automobiles, have, on the dash, or control board, one or more instruments (a speed indicator for example), which require illumination at night. Furthermore, it is desirable that such vehicles shall be provided with a light which can be moved from place to place; as, for example, for the inspection of machinery or tires.

According to my invention I provide in the dash or control board, or in some other suitable location, a socket or holder adapted to receive a suitable plug carrying an electric lamp; and to this plug I attach two conducting wires of a cable, the latter being normally wound upon a spring drum, and being of considerable length. The arrangement is such that when the said lamp-carrying plug is in place within its socket, or holder, its lamp is adapted to illuminate a suitable instrument or instruments, the said cable being fully wound upon the drum; and when desired, the plug may be withdrawn from its said socket or holder, and carried to a considerable distance therefrom, the said cable unwinding from its drum as the plug is moved away from its holder. As the said plug is returned toward its holder, the spring drum automatically rewinds the said cable. Preferably I combine with the plug a cigar lighter or other auxiliary electric device, and provide in the plug a suitable switch whereby, when desired, current may be passed from said cable through said cigar lighter or other auxiliary electric device.

The object of my invention is to provide a lamp carrying device adaptable for a variety of uses and which, while normally occupying a definite location, in which it has a specific function, is readily carried from place to place within a considerable range, without disturbing its electric connections.

In the accompanying drawings I have illustrated my invention as applied to the dash board of an automobile, but it will be understood that I do not thereby limit my invention to use in connection with automobiles.

In the accompanying drawings, illustrating one embodiment of my invention, Figure 1 is an elevation and partial section of a portion of the dash board of a motor vehicle, with the lamp-carrying plug, cable-reel and other parts of the mechanism comprising my invention, applied thereto; Fig. 2 shows a transverse section of the lamp-carrying plug on the line $x$—$x$ of Fig. 1; Fig. 3 shows a transverse section of the spring cable-winding reel on the line $y$—$y$ of Fig. 1; Fig. 4 shows an elevation of the side of the cable-winding reel and support therefor, opposite that shown in Fig. 1.

In the drawings, 1 designates the dash board of an automobile, said dash board provided with a socket 2 adapted to receive a hollow plug 3; this plug being provided at one end with a socket 4 adapted to receive a suitable electric lamp 5; said plug having within it a suitable electric switch, hereinafter described.

6 designates a suitable instrument (speed indicator, clock, or other instrument to be illuminated) shown in this case as mounted on the foot board 7 of the vehicle, the lamp 5 of plug 3 being so positioned, when said plug is in place within its socket, that said lamp may illuminate this instrument 6; and to facilitate such illumination of such instrument I may provide the plug 3 with a reflecting shade 8.

9 designates a reel or drum rotatably mounted upon a support 10 secured, in this instance, to the front side of the dash board 1, said reel or drum being so positioned that an electric cable 11 wound upon it will have a fair lead to the plug 3 and to the socket 2. This drum is provided with a rewinding spring 12 tending normally to keep the cable 11 tightly wound upon the drum. The drum is also provided with a contact ring 13, insulated from the main portion of the drum by insulation material 14; and a spring contact piece 15 secured to the front side of the dash 1, normally contacts with this ring 13. As indicated particularly in Fig. 3, one of the conductors of cable 11 is secured at its end to this ring 13, the end of the other conductor of such cable being connected to the main portion of the reel 9. The reel is provided with a suitable ratchet wheel 16 and latch pawl 17, for holding the reel against the tension of the spring, in various positions; the construction being similar to the ordinary latch mechanism of shade rollers, i. e., being such that the latch will lock the drum against backward movement when the drum starts to rewind slowly, but will not latch when the drum rewinds rapidly.

18 designates a suitable battery or other means for supplying current to the lamp 5. This battery or other generator may be located in any suitable place. From one pole of the battery, a conductor 19 leads to a suitable switch 20, which switch may be of any suitable construction; and hence I do not limit myself to any particular construction. The particular switch indicated is an ordinary panel switch, having a suitable operating button 21. From this switch 20 a conductor 22 leads to the spring contact piece 15. From the other pole of the battery or generator 18 a conductor 23 leads to the support 10 of the reel 9, which support is in electrical connection with the reel itself.

Within the plug 3, one of the conductors of the cable 11 is connected to a socket 24 of a suitable auxiliary electric device, and also to the lamp socket 4. The other conductor of the said cable is connected to a spring contact piece 25 normally in contact with the base contact piece 26 of the lamp 5. The auxiliary socket 24 is adapted to receive a suitable auxiliary electric device 27, which may, with advantage, be an ordinary electric cigar lighter. I do not illustrate the particular construction of such cigar lighter, as such devices are well known. This auxiliary electric device 27 being readily removable from the plug, as shown, any other electric device having a corresponding base, may be substituted for the cigar lighter. Such cigar lighter or other auxiliary electric device located within the socket 24 will have the customary base contact piece 28; and a push button 29 is provided, whereby the spring 25 may be pressed into engagement with this base contact piece 28, without breaking the contact of the spring 25 with the base contact piece 26 of the lamp 5. A spring 30 within the plug 3 presses the contact spring 25 tightly against the base contact piece 26.

It will be apparent that when use of the lamp 5 or auxiliary electric device 27 is desired, the circuit from generator 18 to the lamp 5 may be completed by operation of the switch 20; and that, correspondingly, said circuit may be opened, when desired, by further operation of the switch 20. It will be apparent that when desired the plug 3 may be removed from its socket 2, and carried to any desired point within the range permitted by the length of the flexible electric cable 11, without disturbing the electric circuits; the drum 9 rotating as the cable 11 is withdrawn from it, and being latched in any desired position by the pawl 17, until by a quick jerk on the cable 11, followed by a quick return of that cable, the drum 9 is permitted to be rewound by the spring 12. It will be apparent further that, at any time when the circuit of the battery 18 is closed, the auxiliary device 27 may be energized by pressing the button 29, and so pressing the spring 25 against the base contact piece 28 of that device 27.

What I claim is:—

The combination of a support provided with a device to be illuminated, and provided with a suitable socket, a plug adapted to fit within such socket, and adapted to carry an electric lamp, said socket positioned and said plug proportioned so that an electric lamp carried by said plug will illuminate said device to be illuminated, a cable drum secured in fixed relation to said socket, and an electric cable thereon comprising a plurality of conductors connected to suitable lamp terminals of said plug, circuit conductors and contact means for conveying electric current to the conductors of said cable, and a switch secured to said support and controlling the circuit of said conductors.

In testimony whereof I have signed this specification in the presence of two subscribing witnesses.

WILLIAM H. COLLIER.

Witnesses:
J. T. BERRY,
F. R. CHEATHAM.